Feb. 28, 1956 S. E. HILL ET AL 2,736,350
WEED CUTTER AND SAW
Filed Dec. 21, 1951 4 Sheets-Sheet 1
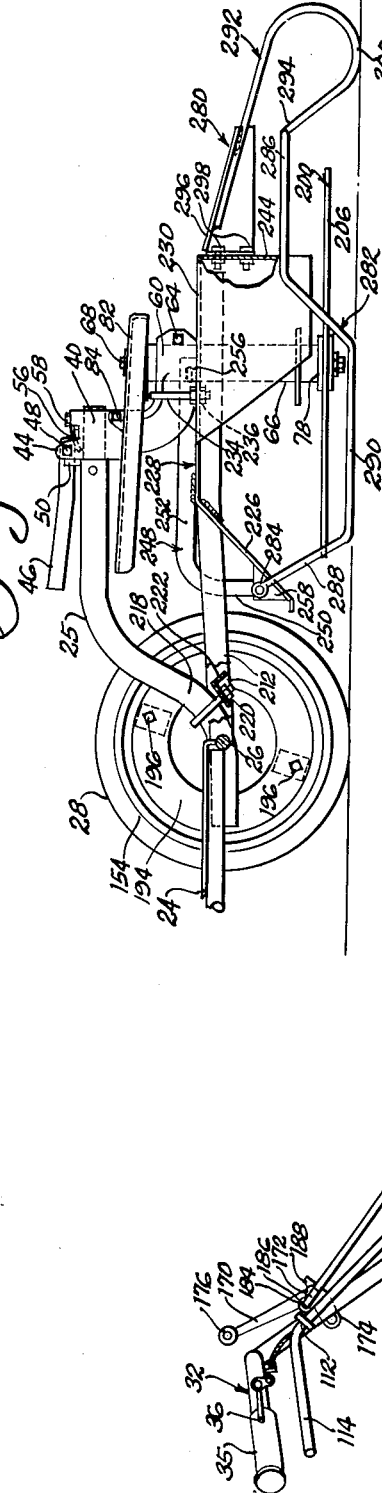
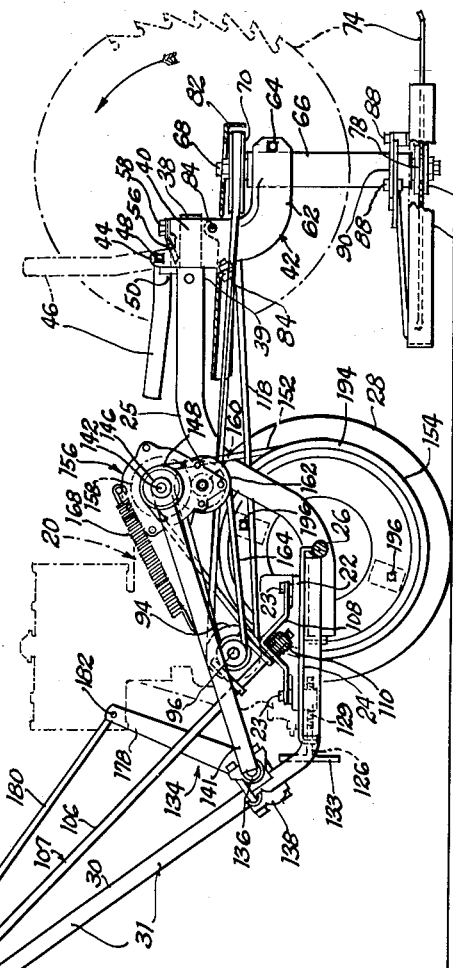
INVENTORS:
Stanley E. Hill and
George W. Welsh
BY Frank H. Marks
Nathan N. Kraus
Attorneys

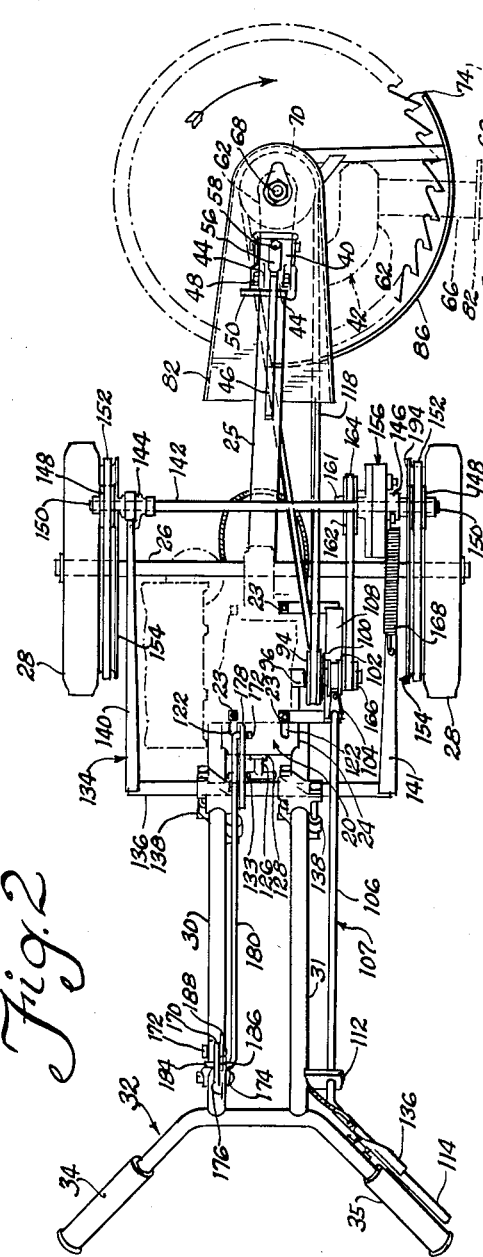
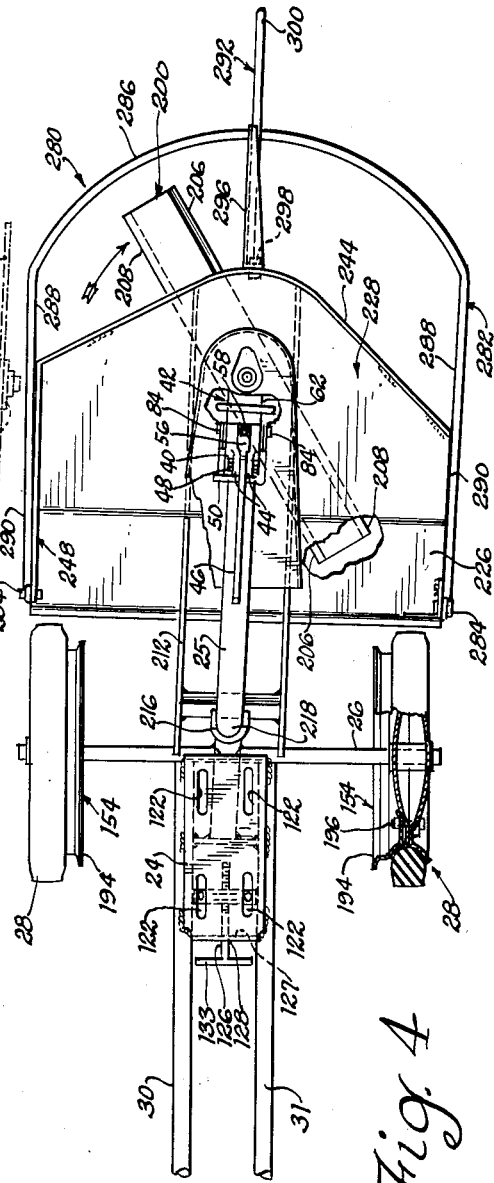

Feb. 28, 1956 S. E. HILL ET AL 2,736,350
WEED CUTTER AND SAW
Filed Dec. 21, 1951 4 Sheets-Sheet 3

INVENTORS.
Stanley E. Hill
George W. Welsh
BY
Frank H. Marks,
Nathan N. Kraus,
Attorneys Feb. 28, 1956  S. E. HILL ET AL  2,736,350
WEED CUTTER AND SAW
Filed Dec. 21, 1951  4 Sheets-Sheet 4
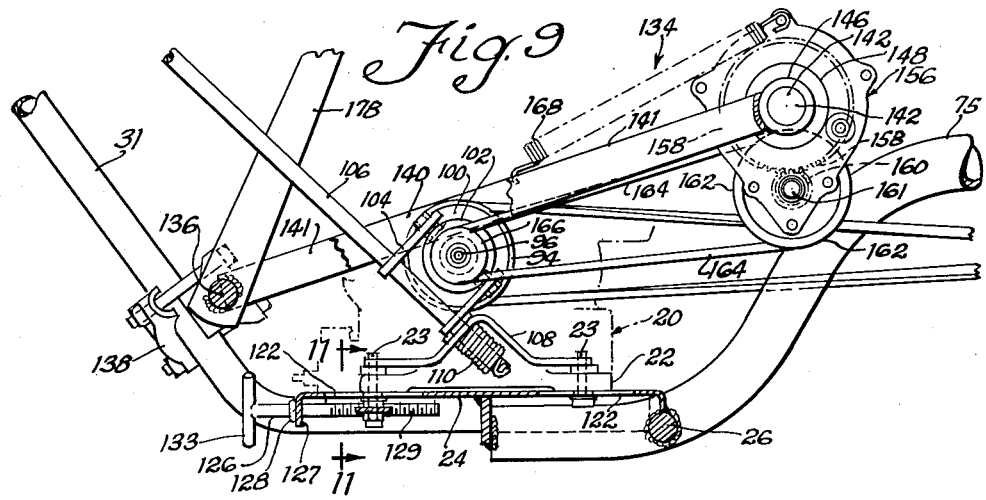
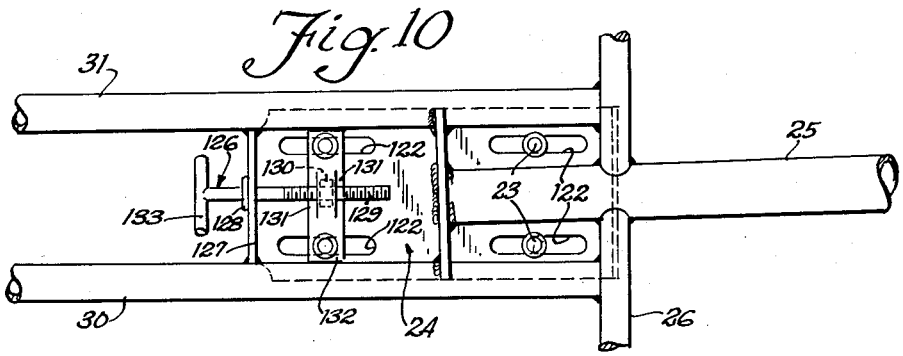
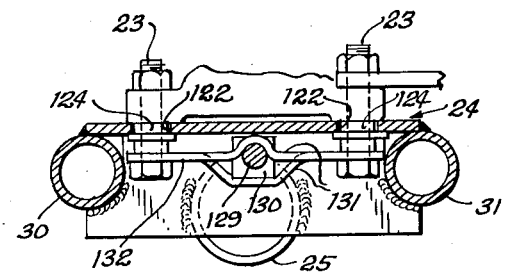
INVENTORS.
Stanley E. Hill &
George W. Welsh
BY
Frank H. Marks
Nathan N. Kraus,
Attorneys

United States Patent Office 2,736,350
Patented Feb. 28, 1956

2,736,350

WEED CUTTER AND SAW

Stanley E. Hill and George W. Welsh, Kankakee, Ill., assignors to Sears, Roebuck and Co., Chicago, Ill., a corporation of New York Application December 21, 1951, Serial No. 262,738

2 Claims. (Cl. 143—43)

This invention relates to wheeled garden or farm implements adapted for cutting grass and weeds and for land clearing by sawing trees, felled trees, brush, thickets, etc.

It is an object of the invention to provide an implement of this character in which a saw may operate in horizontal and vertical positions, the saw in the latter position being normally at an elevation such as to minimize effort of the operator in sawing logs.

Another object is to provide a wheeled implement in which the tension in the engine belt for driving the wheels is automatically adjusted.

A further object is to provide a wheeled implement in which the tension in the engine drive belt for driving the wheels automatically increases and decreases with the load.

An additional object is to provide an implement of the type referred to in which the engine belt for driving the wheels has substantially longer life than in prior constructions.

A further object is to provide an improved adjustment for the engine to adjust the belt to the cutting tool.

It is also an object to provide improved grass and weed cutter guards.

Another object is to provide an improved wheel sheave.

Further objects and advantages of the invention will appear as the description proceeds.

The invention will be better understood upon reference to the following description and the accompanying drawings, in which:

Fig. 1 is a right side elevational view of a vehicle in which the wheels as well as the cutter may be power driven from the same engine;

Fig. 2 is a top plan view of the same;

Fig. 3 (Sheet 1) shows the right end portion of Fig. 1, but with a grass cutter and guard and runner means adapted for use therewith and certain of the structure of Fig. 1 omitted;

Fig. 4 (Sheet 2) is a top plan view of the same with details of the engine adjusting means added;

Fig. 9 is an enlarged view, partly in section and partly in elevation, of the engine adjusting means and the drive from the engine;

Fig. 10 is a bottom plan view of the chassis and associated parts seen in Fig. 9; and Fig. 11 is an enlarged sectional view taken as indicated by the line 11—11 in Fig. 9.

Figure 7:
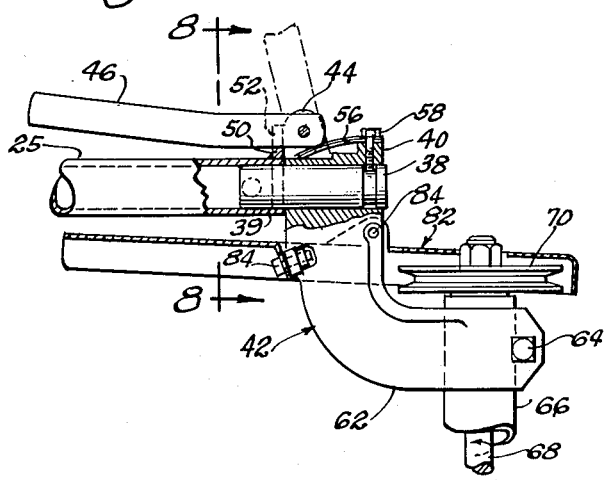
Fig. 7 is a fragmentary view, partly in section and partly in elevation, showing details of the tool mounting structure.

Referring now more particularly to the drawings, showing illustrative embodiments of the invention, there is indicated generally at 20 a gasoline or other suitable internal combustion engine having a base 22 and loosely mounted by bolts 23 on a chassis 24, to which is welded a forwardly extending support tube 25. An axle 26 passes through the rear part of and is welded to the tube 25 and to the chassis 24, and wheels 28 are journaled on the ends of the axle. Left and right frame rods 30 and 31 welded to the chassis 24 and axle 26 extend rearwardly and upwardly, and a handlebar 32, including left and right grips 34 and 35 adapted to be grasped by the operator so that he may conveniently manipulate the vehicle, is welded to the upper ends of the rods. An engine throttle control lever 36 is conveniently mounted adjacent one of the grips. The tube 25 extends forward and upward from the chassis 24 in advance of the wheels 28, and a journal 38 is welded in and projects forward from the forward end 39 of the tube. The rear arm 40 of an angle bracket 42 is rotatably mounted on the journal 38 and has a pair of ears 44 between which a latch arm 46 is hinged as at 48. A quadrant plate 50 is welded to the tube 25 and has a pair of notches 52 and 54, 90° apart, adapted selectively to receive the latch arm 46 so that the bracket 42 may be locked in either of two positions 90° to each other. A leaf spring 56 is secured at 58 to the bracket 42 and extends between the inner end of the latch arm 46 and the bracket and constantly presses against the arm to yieldably retain the arm in the selected one of the notches 52 and 54 or to yieldably retain the arm in a position in which it is entirely free of the notches, as indicated in dot-dash lines in Figs. 1 and 7, where it serves as a handle by means of which the bracket may be manually rotated to the desired position on the journal 38.

The bracket 42 has a forwardly projecting laterally offset arm 62 tightly clamped at 64 about an end portion of a sleeve 66; a mandrel 68 being journaled in the ends of the sleeve. A pulley 70 is fixed to the inner end portion of the mandrel 68, adjacent the bracket arm 62, and a disc saw 74 is removably clamped as at 76 against a flange 78 fixed to the outer end portion of the mandrel. A shield plate 82 secured as at 84 to the bracket arm 40 serves as a guard for the pulley 70 and belt therefor, and a strap 86 detachably secured as at 88 to a flange 90 welded to the sleeve 66 serves as a guard for the saw 74.

Figure 8:
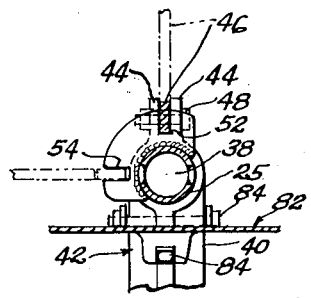
Fig. 8 is a sectional view taken as indicated by the line 8—8 in Fig. 7.

It will now be apparent that when the latch arm 46 is disposed in the notch 52, the saw 74 is horizontal (full lines, Figs. 1, 2, 7 and 8) so that the saw may be used to fell trees, brush, etc., for land clearing, and when the latch arm is located in the notch 54 (dot-dash lines, Figs. 1, 2 and 8), the saw is vertical and thus may be used to cut felled trees into logs. It is, of course, desirable to employ a saw 74 of relatively large diameter. It is also desirable that the saw in its vertical position be substantially elevated from the ground when the handlebar 32 is at a convenient intermediate height for the operator, so that the operator need lower and raise the handlebar a relatively slight distance to enable the saw to cut logs, which is done by commencing at the top of a log and progressing downward. With past constructions the mounting of the saw has been such that the foregoing advantage of elevation in the vertical position has been realized only at the expense of the required use of a relatively small diameter saw or of the saw's being at too high a level when horizontal. With the mounting embodied in the present invention the aforesaid advantage is gained without sacrifice in saw diameter or height in the horizontal position.

A pulley 94 is rotatably mounted on the engine shaft 96 and is adapted to be clutched to and declutched from the shaft by a clutch disc 100 splined to the engine shaft and a grooved shifter collar 102, when the collar is actuated in the appropriate direction by the yoke arms 104 welded to the fulcrum portion 106 of a clutch lever 107. The portion 106 extends downward through a bracket 108 connected by certain of the bolts 23 to the engine 20, a torsion spring 110 being disposed between the bracket and the lower end of the lever 107. The fulcrum portion 106 extends rearward and upward and passes through a bracket 112 welded to the rod 31, and has a laterally extending handle 114 adjacent the grip 35 and adapted to be conveniently manipulated by the operator. The sole function of the torsion spring 110 is to counterbalance the weight of the handle 114.

A belt 118 extending about the engine shaft pulley 94 and also about the mandrel pulley 70 enables the saw 74 to be power-driven from the engine 20. The engine 20 is adjustably mounted to initially tighten the belt 118. To this end, the chassis 24 is formed with laterally spaced parallel longitudinal slots 122 in which the bolts 23 and collars 124 are slidably received and the engine may be adjusted to the necessary extent without the necessity for disturbing the bolts. This adjustment will move the shifter lever 107 slightly in the bracket 112 without affecting its operation. To facilitate backward adjustment of the engine 20, a rod 126 is extended through a vertical portion 127 of the chassis 24 and has a flange 128 engaging the rear face of said portion and a threaded shank 129 in threaded engagement with a nut 130 confined by intermediately separated portions 131 of a strap 132 held by certain of the bolts 23 in assembly with the engine base 22, the rod having a handle 133 for ease of manipulation. To adjust the engine 20 forward, the operator need merely back up the rod 126 and push the engine forward to the desired extent. The nut 130 is loosely held so that it may move transversely of its axis to facilitate alinement with the rod 126.

Using the construction thus far described, the vehicle is propelled by the operator. The vehicle may be equipped for propulsion by the same engine 20 which actuates the mandrel 68. To this end, a unit 134 is removably mounted on the vehicle. The unit 134 comprises a transverse rock shaft 136 journaled in bearings 138 bolted to the frame rods 30 and 31, cantilever arms 140 and 141 welded at their rear ends to the rock shaft, a transverse shaft 142 journaled in bearings 144 and 146 mounted on the forward ends of said arms, and pulleys 148 fixed to the ends 150 of the transverse shaft 142. Belts 152 connect the pulleys 148 to sheaves 154 at the inner sides of the wheels 28. The shaft bearing 146 forms part of a transmission casing 156 containing a gear 158 fixed to the shaft 142 and a smaller gear 160 fixed on a relatively short shaft 161 journaled in the casing and to whose protruding end is fixed a pulley 162 connected by a belt 164 to a pulley 166 fixed to the outer end of the engine shaft 96. A spring 168 anchored at one end to the cantilever arm 141 and at its other end to the transmission casing 156 serves to apply a light initial tension to the belt 164.

A toggle lever 170 is pivoted at 172 to a bracket 174 fixed to the upper end portion of the left frame rod 30 adjacent the left handlebar grip 34 and has a knob 176 at its upper end for easy manipulation. An arm 178 is welded at its lower end to the rock shaft 136 and a link 180 is pivotally connected at 182 to the outer end of the arm and at 184 to the toggle lever boss 186.

When it is desired to power-propel the vehicle, the operator pulls the toggle lever 170 as far as it will go, that is, until its boss 186 engages the left frame rod 30, so that the axis of the toggle lever pivot pin 172 is above the line connecting the axes of the link pivots 182 and 184. This condition is yieldably maintained by virtue of the weight of the parts supported by the rock shaft 136. Thus the pulleys 148 are moved farther away from the axle 26, so that the belts 152 are placed under the desired degree of tension to transmit power to the wheels 28.

When it is desired not to power-propel the wheels 28, the operator pushes the toggle lever 170 as far as it will go that is, until its boss 186 engages the stop 188 on the bracket 174, with the axis of the toggle lever pivot pin 172 below the line connecting the axes of the link pivots 182 and 184. This condition is yieldably maintained by virtue of the weight of the parts supported by the rock shaft 136, with the result that the belts 152 are slackened to such an extent that power will not be transmitted by the belts to the wheels 28. In this condition the vehicle may be propelled by the operator.

When the toggle lever 170 is in the position shown in Figs. 1 and 2, with the parts arranged to enable the engine 20 to drive the ground wheels 28, the tension in the belt 164 is, as noted above, initially produced by the spring 168, and this tension is sufficient to enable the belt to transmit power to drive the ground wheels under optimum (i. e., low load) conditions. Should the terrain rise, the added resistance to the ground wheels 28 is communicated thereby through its pulleys to the belts 152, and by them to the pulleys 148, whereby the transmission casing 156 is rotated counter-clockwise (looking at Fig. 1), with the result that the engine-driven pulley 162 moves away from the fixed engine pulley 166 and thus the belt 164 is tightened and thereby enabled to transmit the increased power necessary for the ground wheels to overcome the added resistance due to the rising terrain. When level ground is thereafter encountered, the consequent reduced resistance to the ground wheels 28 permits the transmission casing 156 to turn clockwise to its initial position, thus easing the tension in the belt 164. And when the terrain descends, the further reduced resistance to the ground wheels 28 results in further clockwise rotation of the transmission casing 156 and consequent further slackening of the belt 164, and, although the belt may slip, it will be maintained under sufficient tension, by virtue of the presence of the spring 168, to maintain it on the pulleys 162 and 166. Thus the tension in the belt 164 varies automatically with the load, and for each load the belt is maintained at the proper corresponding tension.

The wheel pulleys 154 are preferably formed by the inner sides 192 of the tires of the wheels 28 and annular plates 194 bolted at 196 to the wheels.

The saw 74 may be replaced by a grass and weed cutter 200, and in such event the saw guard 86 is removed. The cutter 200 comprises a blade having two alternately usable pairs of diagonally opposite cutting edges 206 and 208. When one pair of edges becomes dull, the blade is removed, reversed, and reclamped with the sharp pair of edges in position for use.

A guard structure for use with the cutter 200 comprises two transversely spaced substantially parallel longitudinal beams 212 whose rear ends are arcuately notched as at 214 to engage the axle 26, where they are securely held by an inverted U-bolt 216 passing over the lower rear end portion 218 of the support tube 25, the ends of the bolt being secured by nuts 220 to a bar strut 222 welded to the beams. The beams 212 pass forward through slots in and are welded to the upper part of the downwardly and rearwardly inclined tail deflector 226 of a guard plate 228 having a substantially horizontal forward roof portion 230 extending over and welded to the forward portions of the beams, said roof portion having a hole 232 affording clearance for the cutter mandrel bearing sleeve 66. The guard plate 228 and the forward ends of the beams 212 are supported by an inverted U-bolt 234 passing over the forwardly projecting bracket arm 62 and downward through the roof portion 230 and receiving nuts 236.

The roof portion 230 has a generally V-shaped front margin 240 rounded at the apex 242, and a head skirt deflector 244 is welded to and depends from said margin to a level slightly above the blade 200, serving to deflect the severed grass and weeds and also any objects impelled to the rear by the blade to thus prevent fouling of the mechanism and protect the operator from injury. Any such objects which manage to be thrown back of the front deflector 244 will strike the tail deflector 226 and thus be deflected to the ground to protect the operator from injury.

An L-shaped bracket 248, arranged in a vertical plane, has its short leg 250 welded to and extending inward from the left rear of the tail deflector 226 and its long leg 252 welded to and over and extending along the left side margin of the roof portion 230. The bracket 248 is formed at its rear end with vertically spaced bolt holes 254 and at its forward end with a horizontal bolt slot 256. A bracket 258 is welded to and extends upward from the right rear of the tail deflector 226 and has a bolt hole 260.

Figure 5:
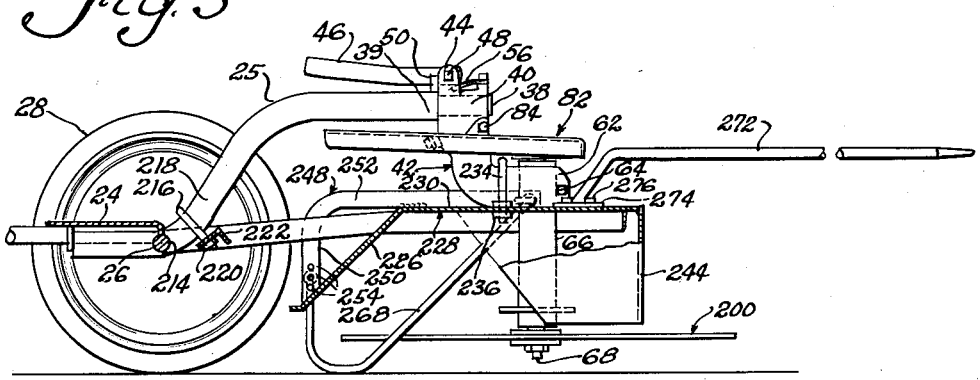
Fig. 5 is similar to Fig. 3 but shows a weed cutter and associated guard, runner and weed rod.
Figure 6:
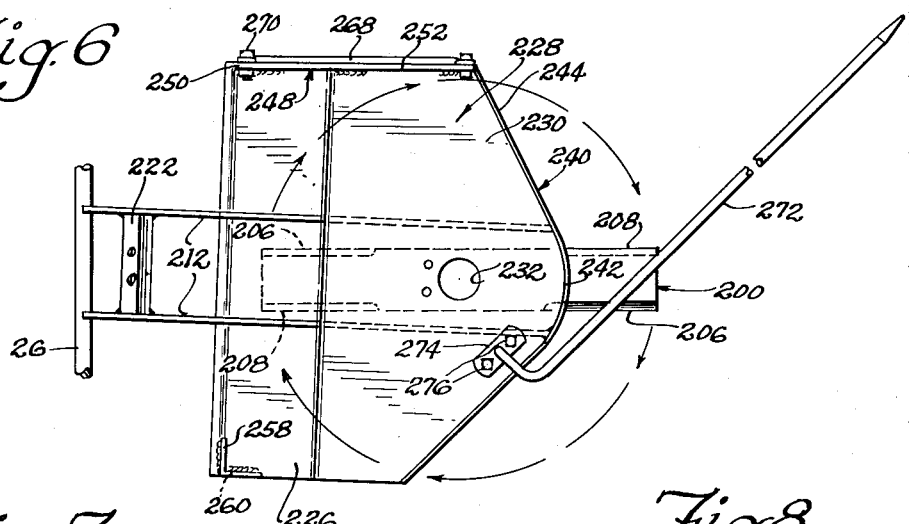
Fig. 6 is a top plan view of the same, omitting the superstructure.

When it is desired to mow weeds, a ground-engaging runner 268 Fig. 5 is bolted at 270 to the bracket 248 and is vertically adjustable by virtue of the several holes 254 in the rear end of the bracket for different heights of weed cut. In addition, a weed rod 272, welded to a bracket 274 secured by bolts 276 passing through the roof plate portion 230, extends diagonally forward to the left and operates to flex the weeds forward and to windrow the severed weed tops to the right.

When it is desired to mow grass, the runner 268 and weed rod 272 are removed, and a guard and runner unit 280 Fig. 3 is mounted in their stead. The unit 280 comprises a generally horizontally extending U-shaped rod 282 whose ends are bolted as at 284 to the brackets 248 and 258, respectively, whose bight 286 extends substantially in advance of the front deflector 244, and whose legs 288 are depressed at 290 to serve as runners. The unit 280 also includes a generally U-shaped rod 292 arranged in a vertical plane and welded at one end 294 to the center of the bight 286 and at its other end to a bracket 296 adjustably attached to the front deflector 244 by bolts 298 passing through selected holes in the deflector, the rod having a depending front bight 300 which serves as a front runner. The unit 280 thus serves to position the blade 200 at the desired elevation, and also to guard against accidentally cutting trees, hedges, and shrubbery as well as persons, and to prevent scalping of the ground. As is apparent, the unit 280 may be readily removed and the runner 268 and weed rod 272 mounted in its stead for grass cutting.

Although various parts are shown and described as being welded together, other suitable fastening means may be employed wherever desired.

Various changes coming within the spirit of my invention may suggest themselves to those skilled in the art. Hence I do not wish to be limited to the specific embodiments described or uses mentioned, but intend the same to be merely exemplary, the scope of my invention being limited only by the appended claims.

We claim:

1. An apparatus of the character described, comprising a frame, a power unit mounted thereon, a transverse axle fixed to said frame, a wheel on each end of said axle, a longitudinally extending support member rigidly fixed to said frame substantially midway between the planes of said wheels and terminating forwardly thereof, said support member having its forward portion upwardly offset from said frame, a substantially L-shaped bracket having a vertical and a horizontal arm, the vertical arm being mounted on the forward portion of said support member for swiveling about the longitudinal axis thereof, the horizontal arm of said bracket extending in offset parallel relation to said support member, a mandrel supported for rotation in said horizontal arm, the axis of said mandrel being at a right angle to the longitudinal axis of said support member, a cutting tool mounted on one end of said mandrel, a pulley mounted on the other end of said mandrel, a belt operatively connecting said power unit with said pulley, a quadrant plate having a plurality of notches therein and fixed on said support member in close proximity to said bracket, a lever pivotally supported at one end on said bracket and adapted to engage in one of the notches in said quadrant to lock said bracket in a position of adjustment, and resilient means adapted to normally urge said lever into engagement with one of said notches.

2. An apparatus of the character described, comprising a frame, a power unit mounted thereon, a transverse axle fixed to said frame, a wheel on each end of said axle, a longitudinally extending support member rigidly fixed to said frame substantially midway between the planes of said wheels and terminating forwardly thereof, said support member having its forward portion upwardly offset from said frame, a substantially L-shaped bracket having a vertical and a horizontal arm, the vertical arm being mounted on the forward portion of said support member for swiveling about the longitudinal axis thereof, the horizontal arm of said bracket extending in offset parallel relation to said support member, a mandrel supported for rotation in said horizontal arm, the axis of said mandrel being at a right angle to the longitudinal axis of said support member, a cutting tool mounted on one end of said mandrel, a pulley mounted on the other end of said mandrel, a belt operatively connecting said power unit with said pulley, a quadrant plate fixed on said support member in close proximity to said bracket and having a plurality of notches therein, said bracket having a pair of integral pierced ears opposite the horizontal arm thereof, a lever pivotally supported between said ears and adapted to engage in one of the notches in said quadrant to lock said bracket in a position of adjustment, and spring means carried on said bracket and adapted to normally urge said lever into engagement with one of said notches.

References Cited in the file of this patent

UNITED STATES PATENTS

| Number | Name | Date |
|---|---|---|
| 819,377 | Price | May 1, 1906 |
| 937,211 | Holsman | Oct. 19, 1909 |
| 1,261,746 | Grob | Apr. 2, 1918 |
| 1,473,536 | Avery | Nov. 6, 1923 |
| 1,482,013 | Jarvis et al. | Jan. 29, 1924 |
| 1,935,878 | Hamerstadt | Nov. 21, 1933 |
| 2,312,972 | Orr | Mar. 2, 1943 |
| 2,398,300 | Frazier | Apr. 9, 1946 |
| 2,407,028 | McLean | Sept. 3, 1946 |
| 2,480,893 | Whittle | Sept. 6, 1949 |
| 2,497,639 | Underwood | Feb. 14, 1950 |
| 2,498,138 | Shepard et al. | Feb. 21, 1950 |
| 2,523,439 | May | Sept. 26, 1950 |
| 2,529,328 | Carter | Nov. 7, 1950 |
| 2,549,317 | Laughlin | Apr. 17, 1951 |
| 2,591,746 | Tom | Apr. 8, 1952 |
| 2,597,017 | McKinstry | May 20, 1952 |
| 2,613,698 | Gregson | Oct. 14, 1952 |
| 2,626,671 | Hardy et al. | Jan. 27, 1953 |
| 2,635,649 | Brounlee | Apr. 21, 1953 |

FOREIGN PATENTS

| Number | Country | Date |
|---|---|---|
| 27,542 | Sweden | Oct. 16, 1909 |
| 126,747 | Australia | Feb. 6, 1948 |
| 139,339 | Australia | Nov. 9, 1950 |